United States Patent Office 3,056,293
Patented Oct. 2, 1962

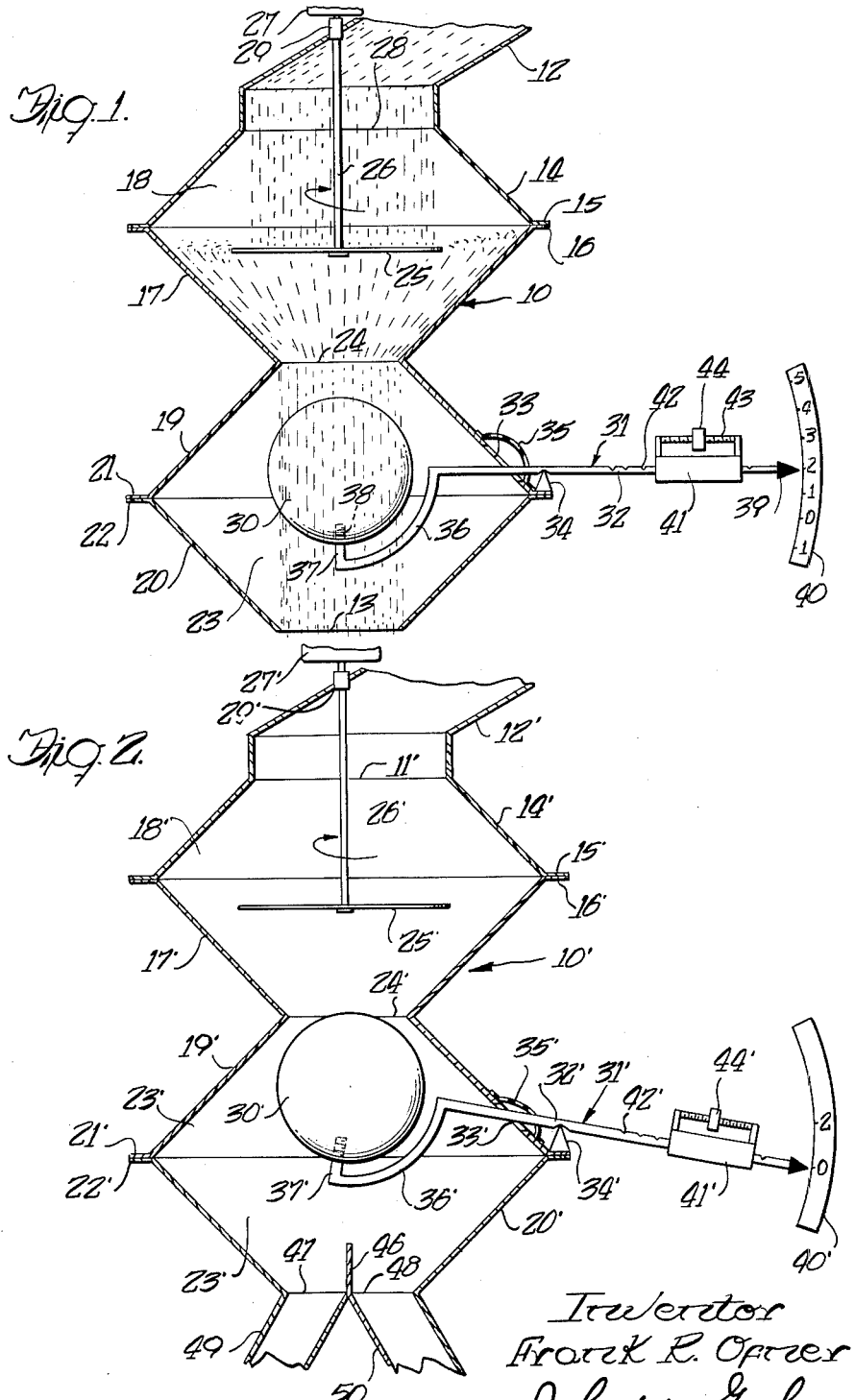

3,056,293
FLOW MEASURING AND DIVIDING SYSTEM
Frank R. Ofner, Portland, Oreg., assignor, by mesne assignments, to Industrial Powertronix, Inc., Portland, Oreg., a corporation of Oregon
Filed Oct. 21, 1957, Ser. No. 691,338
15 Claims. (Cl. 73—198)

This invention relates to a system for measuring the flow of material through a conduit, and for dividing the flow of such material into a plurality of individual streams. The system is especially suited for use with materials of particulate character.

Measuring the flow of solids through a conduit is often necessary; and because of this, various measuring arrangements have been proposed heretofore. Generally, such arrangements have included the interposition of an obstruction in the flow path, which is engaged by the solids and responds in a predetermined manner to the total force of the solids impacting the same. The difficulty with the prior art systems is that they are extremely inaccurate and, in reality, do little more than indicate the initiation and termination of the flow. Furthermore, they are often complex and expensive in spite of the unreliability thereof in measurement indications.

In view of this, an object of the present invention is to provide a measuring system which is reliable and relatively accurate, and which is characterized by simplicity in structure and function. Another object of the invention is in the provision of a system for accurately measuring the flow of material through a vertical conduit, and especially solid particulate material such as grain, flour, sand, etc., although the system may also be used in the measurement of liquid flow provided that a backhead of the liquid is not present at the measuring site.

Still another object is that of providing a system of the character described, wherein a flow sensing device is positioned within a vertical conduit section so that material flowing downwardly therethrough impacts the sensing device, whereupon indicia means arranged therewith provides an indication of the displacement of the sensing device in terms of flow rate. Yet a further object is to provide means interposed in such a flow conduit above the sensing device, for interrupting the free flow of material and for then passing it downwardly toward the sensing device so that the impact of each quantum of material against the sensing device comprises a predetermined initial velocity which is substantially zero and a known displacement as terms thereof.

A further object of the invention is to provide a sensing device having a preselected geometric configuration which causes each impact of material thereagainst to deliver a definite amount of energy thereto irrespective of the impact point thereon and, as a necessary correlary thereof, a configuration which will not impede the continuous flow of material therepast. Yet a further object is in the provision of a sensing device of the type described, wherein the predetermined configuration is spherical, and wherein the means disposed thereabove for interrupting the free flow of material also serves to uniformly distribute the material across the conduit. Additional objects and advantages will become apparent as the specification develops.

Embodiments of the invention are illustrated in the accompanying drawing, in which:

FIGURE 1 is a broken, vertical sectional view of a flow conduit having the inventive system incorporated therein; and FIGURE 2 is a broken, vertical sectional view similar to that of FIGURE 1, but including also the means for dividing the flow into various streams.

The apparatus illustrated in FIGURE 1 comprises a generally vertical conduit section designated in its entirety with the numeral 10. The conduit 10 has an inlet 11 communicating with an angularly disposed chute or feed conduit 12. A discharge opening 13 is provided at the lower end of the section 10, and may communicate with a hopper or with further flow conduits, neither of which are shown. In the specific structure illustrated, the infeed conduit 12 is formed integrally with a flared or generally bell-shaped section 14 which comprises a part of the vertical flow conduit 10. The section 14 at its lower end is equipped with a laterally extending flange 15 that abuts a similar flange 16 with which an inverted, generally bell-shaped conduit section 17 is equipped. The sections 14 and 17 are secured together by spot welding the contiguous flanges 15 and 16, or by passing screws or rivets through openings provided therefor.

Disposed below the sections 14 and 17, which define therein a distribution chamber 18, are similarly configurated and oriented conduit sections 19 and 20 having, respectively, abutting flanges 21 and 22 which are secured to each other. The lower conduit sections define a measuring or sensing chamber 23 therein. It is evident that the adjacent sections 17 and 19, which may be integral with each other as illustrated in FIGURE 1, define a restricted passage or opening 24 through which material must flow in moving from the distribution chamber 18 into the measuring chamber 23.

The conduit 10 and infeed 12 therefor may be made of any suitable material (such as sheet metal), and ordinarily the material will be selected so that it is not adversely influenced by the materials flowing therethrough. Similarly, the specific construction of the conduit 10 may take various forms, although the precise configuration illustrated has been found advantageous.

Mounted within the distribution chamber 18 is a disc 25 affixed to the shaft 26 of a motor 27. Consequently, when the motor is energized, the disc 25 is rotated. It is noted that the disc has a diameter that corresponds with the diameter of the inlet 11 so that substantially all of the material flowing therethrough is intercepted by the disc to terminate the free fall of the flow material. The shaft 26 of the motor extends through an aperture 28 in the wall of the infeed conduit 12 to permit the motor to be mounted exteriorly thereof. Preferably, a seal such as a packing gland 29 is arranged with the shaft and opening so as to prevent the escape of material along the shaft. Any suitable arrangements may be employed to support the motor with respect to the conduits.

Mounted within the measuring chamber 23 is a sensing device 30 in the form of a sphere supported at the vertical axis thereof by a lever, designated in general with the numeral 31. The lever 31 has a generally horizontal arm 32 which extends through an opening 33 in the wall of the conduit section 19, and is supported for pivotal movement on a fulcrum 34 that may be mounted exteriorly of the conduit section upon the flange 21 thereof. Preferably, a seal 35 encloses the opening 33 and the portion of the arm 32 passing therethrough so as to prevent the escape of material. It will be evident that the seal 35 should not restrict free pivotal movement of the lever, and it may take the form of a sleeve made of rubber or other flexible material.

At its inner end, the arm 32 is bent downwardly and laterally and defines an arcuate portion 36 having a radius of curvature corresponding to that of the spherical sensing device 30. The arcuate portion 36 may be formed integrally with the arm 32, and at its lower end is equipped with an upwardly turned, generally vertical shaft 37, threaded at its end (as shown at 38) so as to provide a means for rigidly mounting the sensing device 30 thereon. At its outer end, the lever, or particularly the arm 32 thereof, is equipped with a pointer 39 arranged with a scale 40 having numerical indicia thereon.

Means are provided for biasing or counter-balancing the sensing device 30 and for calibrating the sensing device and the lever and scale associated therewith for different materials which may be passed through the conduit 10. Various arrangements may be employed for accomplishing such counter-weighting and adjusting as a spring having adjustable means for selectively tensioning the same, or the weighted slide bar 41 shown which is movable along the longitudinal axis of the arm 32 and is located at preselected positions therealong by means of a tooth which fits into notches 42 spaced along the upper side of the arm. It is apparent that the slide weight 41 is a gross adjustment; and advantageously, a vernier adjustment is included which may comprise a threaded shaft 43 having a threaded weight member 44 mounted thereon. If desired, the arm 32 may have a scale extending therealong, calibrated to indicate the preferred position of the weighted slide bar 41 for the different materials that may be passed through the conduit 10.

The modified structure illustrated in FIGURE 2 is substantially similar to that heretofore described; and for that reason, the identical components will not be described and are identified by the primed form of the numerals used in FIGURE 1. In addition to showing a variation from the structure illustrated in FIGURE 1, the second view shows the normal position of the sensing device and lever when no material is flowing through the conduit, while FIGURE 1 shows the preferred position of these elements when the normal flow volume is passing therethrough.

Thus, it is seen that at a no-flow condition, the lever arm is rotated slightly from a horizontal position about the fulcrum thereof in a clockwise direction, with the result that the axis of the sensing device has a slight angular orientation with respect to a true vertical line. On the other hand, at normal flow conditions, the lever arm is substantially horizontal whereby the axis of the sphere, i.e., the axis defined as a line through the geometric center of the sphere and the point on the surface thereof at which connection is made with the lever arm, is substantially vertical. This affords a more accurate indication of variations in the flow rate from normal. The flow material is shown in FIGURE 1, and is indicated generally with the numeral 45.

The FIGURE 2 structure contemplates an arrangement for dividing the flow material into a plurality of streams; and to accomplish this result, the outlet opening provided by the section 20' is segmented by one or more divider baffles 46. One such baffle is shown, and consequently the discharge opening comprises two separated outlets 47 and 48 that communicate, respectively, with flow conduits 49 and 50. The baffle 46 is rigidly secured to the adjacent walls of the conduits 49 and 50, and extends diametrically across the discharge opening in alignment with the vertical axis of the spherical sensing device 30'.

This causes the flow material, which is uniformly distributed about the measuring chamber 23', to be substantially evenly divided by the baffle 46 into two separate streams, with the result that the streams passing through the conduits 49 and 50 are approximately equal. As indicated above, one or more baffles may be provided to define the desired number of outlet segments, each of which will be connected to a separate flow conduit.

Since the material passing downwardly through the measuring chamber 23' is uniformly distributed thereabout, an odd number of outlet segments may be formed by the baffle arrangements. For example, a baffle could be included which extended laterally and at right angles to the baffle 46 in only one direction therefrom. Such a construction would form three separate flow streams, one of which would have twice the volume of each of the other two.

To use the system, the apparatus is disposed in a flow conduit as shown in FIGURES 1 and 2, in the manner described hereinbefore. As material flows downwardly through the infeed conduit 12, substantially the entire mass thereof is momentarily arrested by a spreader 25, which at such time is being rotated by the motor 27. The rotation of the spreader will cause such interrupted material to be thrown outwardly therefrom because of the resultant centrifugal force acting thereon, and the outwardly moving material will engage the downwardly and inwardly inclined walls of the vertical conduit section 17. Preferably, the conduit 12 and section 17 are connected through a vertical neck so as to direct all of the material downwardly and onto the spreader plate. Thus, all particles or quantums of material falling downwardly from the elevation of the disc 25 will have substantially the same initial velocity which will be very close to zero. The function of the disc is to distribute the material uniformly throughout the cross section of the vertical conduit.

As the material descends from the disc 25, it is forced inwardly because of the converging walls of the conduit section 17, and must flow through the restricted opening 24. Since the diameter of the spherical sensing device 30 is approximately equal to the diameter of the opening 24, all of the particles will then fall onto the sensing device and will impact the same. The resultant force applied thereto will cause the sensing device to move downwardly, or to rotate in a counter-clockwise direction about the fulcrum 34 from the initial or inflow position shown in FIGURE 2 to the centrally oriented position illustrated in FIGURE 1. After impacting the sensing device, the particles move downwardly therefrom and outwardly from the vertical conduit section through the opening 13 thereof (in the form shown in FIGURE 1), or through the openings 47 and 48 of the FIGURE 2 embodiment.

Preferably, the sensing device is adjusted by means of the weights 41 and 44 so that the pointer 39 thereof is centered along the scale 40 when the normal volume or flow of material through the vertical conduit section is present. If the flow is in excess of the expected normal, the sphere 30 will move downwardly and, of course, the pointer 39 will move upwardly along the scale to show this increase in flow. Conversely, if the flow volume decreases, the sphere and pointer assembly will rotate in a clockwise direction about the fulcrum 34 to thus provide a visual indication of the reduced flow rate. It has been found that variations are more accurately indicated when the position of the sphere 30 at normal flow rate is as shown in FIGURE 1, with the diameter of the sphere defined by the point of connectoin of the arm 37 thereto in a substantially vertical plane.

As noted before, it may be necessary to adjust the sensing device for materials of different type, and adjustment thereof is afforded by the gross weight 41 which is slidable along the arm 32 in increments defined by the notches 42 and by the vernier weight 44 threadedly mounted upon the shaft 43. If material having a lesser specific gravity is passing through the conduit, the total impact force thereof acting downwardly against the sphere 30 will be smaller, which will require shifting of the weights 41 and 44 toward the left as viewed in FIGURE 1; and conversely, materials of greater specific gravity will require movement of the weights toward the right along the arm 32.

It is necessary that the sensing device 30 permit the immediate passage of particles therepast after impact engagement of the particles therewith, and the spherical configuration provides that result. It may be noted that substantially the entire lower half of the sphere 30 is essentially non-functional in the sense that it is not engaged by the material flowing through the conduit, and therefore the device 30 could be semi-spherical. In order that the system be accurate, each particle that impacts the device 30 should deliver the same amount of energy thereto irrespective of the point on the surface of the device at which the impact occurs.

The spherical, or more especially the semi-spherical, configuration yields this result, which can be established through vector analysis of the forces involved. That is to say, the force which causes the device 30, etc. to pivot in a counter-clockwise direction about the fulcrum 34, is only the force which is the sum of the individual downwardly directed force components resulting from the impact of each particle with the spherical surface, and this total force has an effective point of application along the diameter of the sphere defined by the point of connection of the arm 37 thereto. It is believed that the spherical configuration shown is the only practicable shape which automatically compensates for the different points of impact along the surface thereof so as to permit each particle to deliver the same effective downward momentum or impact force thereto, irrespective of where the particles impact the surface (assuming the particles are of identical weights and have identical velocities at the moments of impact). Theoretically, a parabolic sensing device affords the most perfect results in this respect, but the spherical configuration is a sufficiently close approximation thereto, unless exceedingly large structures are employed, so as to yield the requisite accuracies, and is a less costly, more easily obtained structure.

While in the foregoing specification embodiments of the invention have been set forth in considerable detail for purposes of making an adequate disclosure thereof, it will be appreciated that those skilled in the art may make numerous changes in those details without departing from the spirit and principles of the invention.

I claim:

1. In a system of the character described for use in measuring the downward flow of material through a generally vertical conduit section, a sensing device disposed in such conduit section and having a diameter substantially as great as the minimum conduit diameter just above so as to be impacted along the upper surface thereof by substantially all of the material flowing downwardly there past, an arm connected to said sensing device and extending laterally outwardly through such conduit and being fulcrumed intermediate the ends thereof to permit relatively free movement of said sensing device generally upwardly and downwardly within the conduit, measuring apparatus including means connected with said arm for biasing the same toward a predetermined location within said conduit section with a given material flow rate, therethrough said sensing device being a geometric form having a generally spherical curvature throughout at least that portion of the upper surface thereof impacted by such downward flowing material.

2. The system of claim 1 in which said sensing device is a sphere, and in which said arm is connected thereto at a point defining a generally vertical diameter thereof.

3. The system of claim 1 in which means are provided in said conduit a spaced distance above said sensing device for momentarily interrupting the downward flow of material therethrough to enforce the condition that substantially all quantums of such material impacting said sensing device have substantially the same terminal impact velocity.

4. The structure of claim 3 in which said means comprises a rotatable disc extending transversely across said conduit and having a diameter substantially as great as the minimum conduit diameter just above.

5. The combination with a generally vertically oriented flow conduit adapted to pass particulate solids and the like downwardly therethrough, of a flow measuring system comprising a sensing device mounted within said conduit and having a geometric form of generally spherical curvature throughout at least the upper surface portion thereof impacted by such solids and a lever arm connected wtih said sensing device at a location substantially along a generally vertical axis through the origin of said spherical curvature which axis extends along the longitudinal axis of the conduit, said lever arm being pivotally supported intermediate the ends thereof to provide limited movement of said sensing device along the axis of said conduit, the diameter of said spherical curvature being related to the diameter of said conduit and the flow path of such solids therethrough so that substantially all of such solids impact said sensing device in flowing downwardly therepast.

6. The combination of claim 5 in which said conduit is provided with a restriction therein defining a predetermined cross sectional area through which such solids must flow, and in which said sensing device is disposed in said conduit in spaced adjacency below said restriction.

7. The combination of claim 6 in which a flow interrupter is positioned within said conduit above said restriction therein for momentarily arresting the downward movement of such solids prior to flow thereof through said restriction.

8. The structure of claim 7 in which said interrupter comprises a rotatably driven disc for spreading such solids flowing through the conduit substantially uniformly along the walls of said restriction.

9. The structure of claim 8 in which said lever arm is pivotally supported adjacent a wall of said conduit and extends laterally outwardly therethrough to define an indicator providing a visual indication of the quantity of solids flowing through said conduit.

10. The structure of claim 9 in which said lever arm is equipped with adjustable biasing means adjacent the outer end thereof for calibrating the measuring system.

11. In a system of the character described, a generally vertical flow conduit comprising a distribution chamber and a sensing chamber spaced vertically therebelow, said conduit having a restricted cross section interposed between said chambers and defining a passageway therebetween, a spreader mounted within said distribution chamber for distributing material flowing therethrough substantially uniformly thereabout, and a flow measuring arrangement associated with said sensing chamber and comprising the combination of a sensing device mounted therein having a geometric configuration of substantially spherical curvature throughout the upper surface portion thereof impacted by such material flowing downwardly therepast, means for supporting said sensing device centrally within said sensing chamber in alignment with said passageway and for movement generally along the longitudinal axis of said conduit, and means exteriorly of said conduit and arranged through the aforesaid means with said sensing device for indicating the position tending to be enforced thereon within said sensing chamber by the material impacting thereagainst, said sensing device being dimensioned with respect to the cross sectional area of said passageway so that substantially all of the material flowing into the sensing chamber impacts the sensing device.

12. The apparatus of claim 11 in which a plurality of flow conduits communicate with said sensing chamber at the outlet thereof, and in which at least one baffle is positioned within the sensing chamber in adjacent said plurality of flow conduits to divide the material flowing therethrough into predetermined quantities for respective passage into the plurality of flow conduits.

13. In a system of the character described, a generally vertical flow conduit comprising a distribution chamber and a sensing chamber spaced vertically therebelow, said conduit having a restricted cross section interposed between said chambers and defining a passageway therebetween, a spreader mounted within said distribution chamber for distributing material flow therethrough substantially uniformly thereabout and for enforcing an approximately zero vertical velocity on such material at the initiation of its downward movement therepast, and a flow measuring arrangement associated with said sensing chamber and comprising the combination of a sensing device mounted therein and having an arcuate impact surface, means for supporting said sensing device centrally within said sensing chamber in alignment with said passageway and for movement generally along the longitudinal axis of said conduit, and means arranged with said sensing device for indicating the position tending to be enforced thereon within said sensing chamber by the material impacting thereagainst, said sensing device being dimensioned with respect to the cross sectional area of said passageway so that substantially all of the material flowing into the sensing chamber impacts the sensing device.

14. The system of claim 13 in which said sensing device is generally parabolic.

15. The system of claim 13 in which a plurality of flow conduits communicate with said sensing chamber at the outlet thereof, and in which at least one baffle is positioned within the sensing chamber adjacent said plurality of flow conduits to divide the material flowing therethrough into predetermined quantities for respective passage into the plurality of flow conduits.

References Cited in the file of this patent

UNITED STATES PATENTS

| | | |
|---|---|---|
| 599,746 | St. John | Mar. 1, 1898 |
| 1,025,809 | Kieser | May 7, 1912 |
| 1,414,388 | Wilson | May 2, 1922 |
| 1,583,574 | Carter | May 4, 1926 |
| 2,147,344 | Horner | Feb. 14, 1939 |
| 2,189,018 | Robinson | Feb. 6, 1940 |
| 2,610,646 | Michaelson et al. | Sept. 16, 1952 |
| 2,614,425 | Falk | Oct. 21, 1952 |
| 2,659,881 | Bogot et al. | Nov. 17, 1953 |
| 2,687,646 | Goddard | Aug. 31, 1954 |
| 2,720,889 | Gothberg | Oct. 18, 1955 |